United States Patent [19]

King

[11] Patent Number: 5,036,798
[45] Date of Patent: Aug. 6, 1991

[54] ANIMAL FEEDER WITH ADJUSTABLE GATE

[75] Inventor: Brent A. King, Victoria, Ill.

[73] Assignee: King Systems, Inc., Victoria, Ill.

[21] Appl. No.: 481,588

[22] Filed: Feb. 20, 1990

Related U.S. Application Data

[63] Continuation-in-part of Ser. No. 330,401, Mar. 29, 1989, Pat. No. 4,911,727.

[51] Int. Cl.$^5$ .............................................. A01K 5/00
[52] U.S. Cl. ...................................... 119/53.5; 119/54
[58] Field of Search ........................ 119/52.1, 53, 53.5, 119/54

[56] References Cited

U.S. PATENT DOCUMENTS

| | | | |
|---|---|---|---|
| 1,553,502 | 9/1925 | Boyes . | |
| 4,306,518 | 12/1981 | Herring | 119/53.5 |
| 4,377,130 | 3/1983 | Schwieger | 119/51.5 |
| 4,385,591 | 5/1983 | Peterson | 119/53.5 |
| 4,491,087 | 1/1985 | Herring | 119/53.5 |
| 4,790,266 | 12/1988 | Kleinsasser et al. | 119/51.5 |
| 4,911,727 | 3/1990 | King | 119/53 |

Primary Examiner—John G. Weiss
Attorney, Agent, or Firm—Marshall, O'Toole, Gerstein, Murray & Bicknell

[57] ABSTRACT

An animal feeder comprises a trough and a hopper located above the trough. The hopper has a bottom discharge opening the size of which is determined by a slideable gate positioned by an adjusting mechanism. Structure is provided to permit animal actuated movement of the gate upwardly and inwardly relative to the discharge opening. A shelf located above the trough and below the hopper discharge opening receives feed from the hopper and holds it there. Structure is provided which prevents the animal from feeding directly from the shelf but permits the animal to sweep feed with its snout from the shelf into the trough.

19 Claims, 3 Drawing Sheets

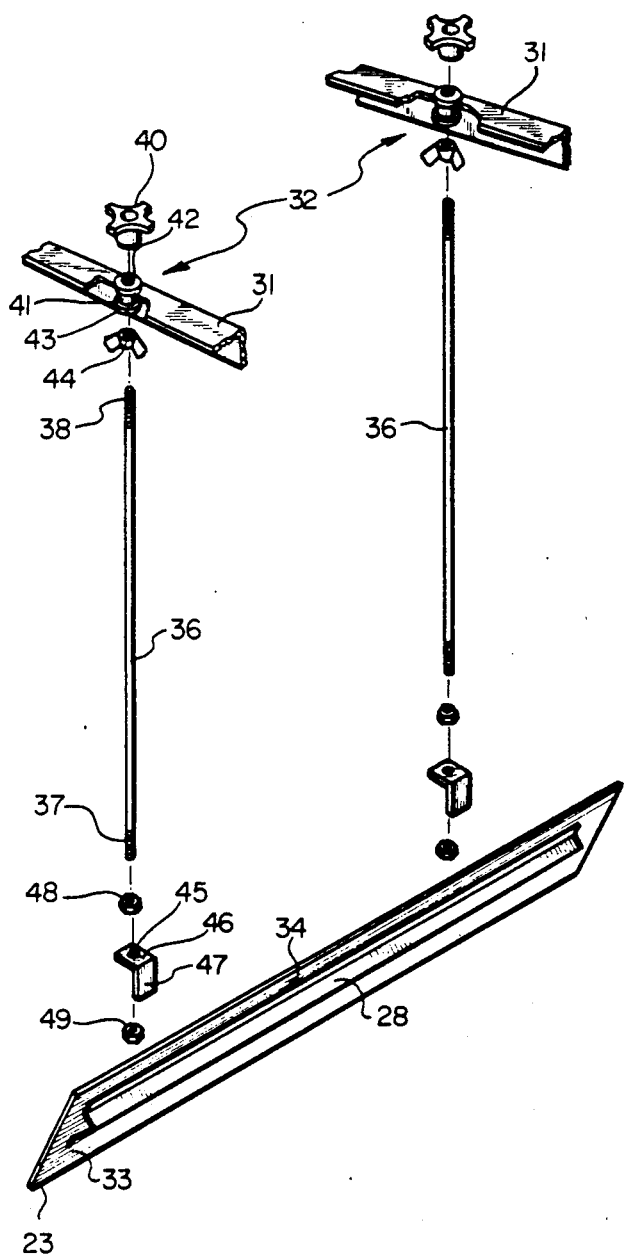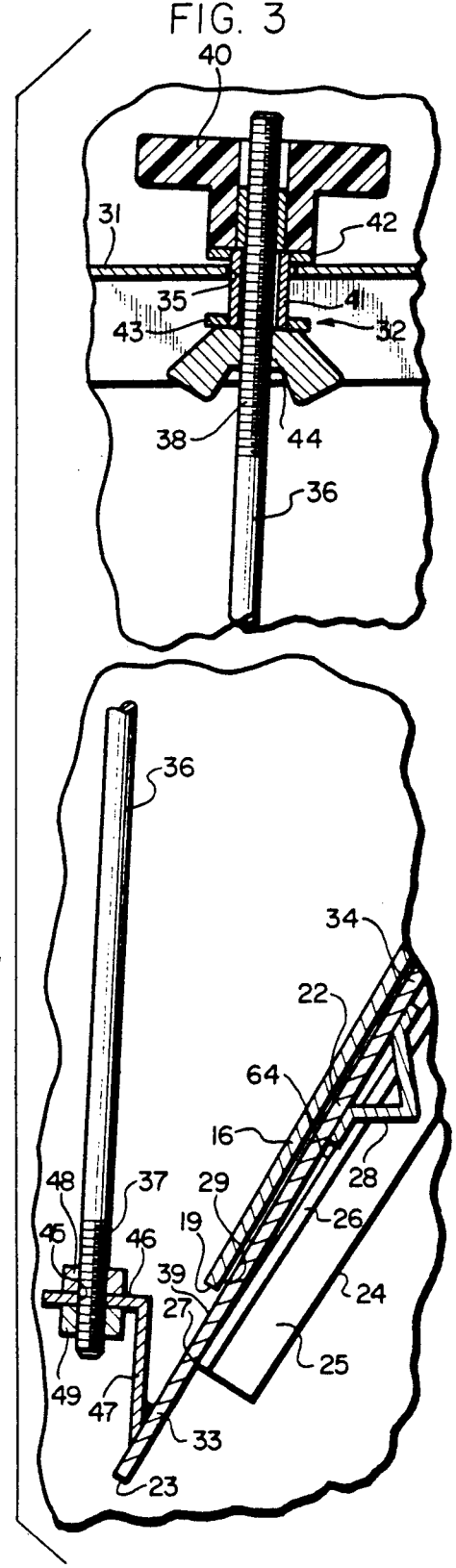

ANIMAL FEEDER WITH ADJUSTABLE GATE

RELATED APPLICATION

This is a continuation-in-part of application Ser. No. 07/330,401 filed Mar. 29, 1989, entitled "ANIMAL FEEDER", now U.S. Pat. No. 4,911,727 issued Mar. 27, 1990, and the disclosure thereof is incorporated herein by reference.

BACKGROUND OF THE INVENTION

The present invention relates generally to feeders for animals such as hogs, and more particularly to feeders of the type in which feed is dispensed from the bottom opening of a hopper onto a shelf from which the feed is swept by the animal, with its snout, into a trough located below the shelf. In the feeder described in the related application, the hopper has an inclined sidewall extending downwardly and inwardly toward the hopper's bottom opening, and the shelf and the inclined hopper sidewall comprise structure cooperating to permit the animal to sweep feed from the shelf into the trough while substantially preventing the animal from feeding directly from the shelf. The advantages of a hopper having the features described in the preceding portion of this paragraph are discussed in the aforementioned related application.

A hopper of the type described in the preceding paragraph has a gate located at the bottom of the inclined hopper sidewall. This gate is mounted for sliding movement along the hopper sidewall in a direction having a substantial vertical component. The gate has a lower edge normally located directly above the shelf, and the vertical distance between the gate's lower edge and the shelf determines the size of the discharge opening at the bottom of the hopper. There is an adjustment mechanism manually actuable to move the gate and vary the distance between the gate's lower edge and the shelf, thereby to vary the size of the hopper's bottom discharge opening.

There are circumstances in which it is desirable to provide for animal actuated movement of the gate. A gate which is fixed against animal actuated movement is undesirable.

SUMMARY OF THE INVENTION

An animal feeder constructed in accordance with the present invention includes structure which allows animal actuated upward movement of the entire gate and animal actuated inward movement of at least the lower edge of the gate. The gate is normally urged by gravity toward its lower position, and structure is provided which normally urges the lower edge of the gate in an outward direction.

In a preferred embodiment, the gate is provided with a handle which can be engaged by the snout of the animal to facilitate the raising of the gate by the animal. In another embodiment, there is structure which is engageable by the snout of the animal to facilitate animal actuated inward movement of the lower edge of the gate.

Another feature of the present invention is structure which provides a further impediment to direct feeding by the animal from the shelf.

Other features and advantages are inherent in the structure claimed and disclosed or will become apparent to those skilled in the art from the following detailed description in conjunction with the accompanying diagramatic drawings.

BRIEF DESCRIPTION OF THE DRAWINGS

FIG. 2 is an exploded perspective of an adjusting mechanism for a hopper gate employed in the present invention;

FIG. 3 is an enlarged, fragmentary, sectional view of the gate adjusting mechanism.

DETAILED DESCRIPTION

Figure 1:
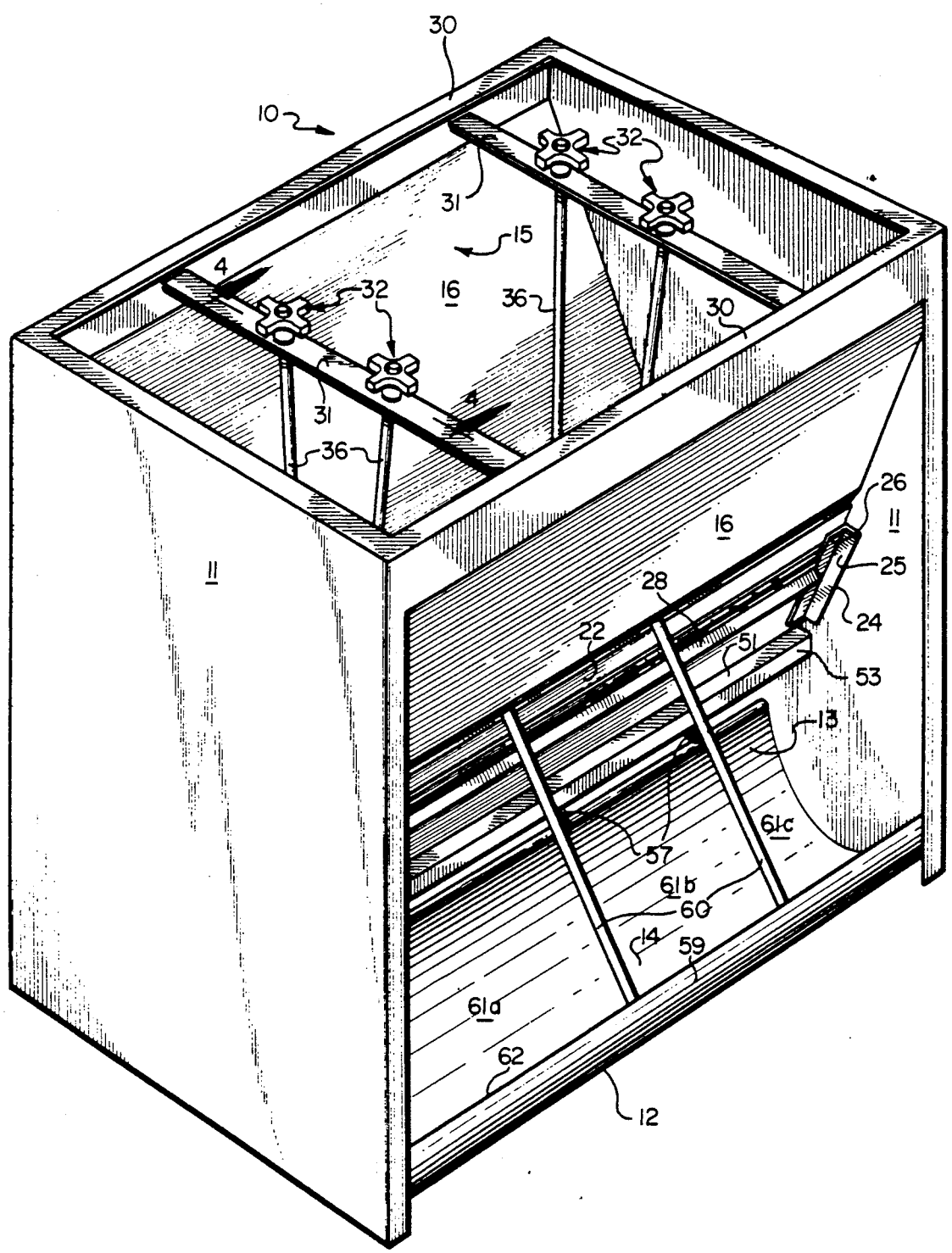
FIG. 1 is a perspective of an embodiment of an animal feeder constructed in accordance with the present invention.
Figure 4:
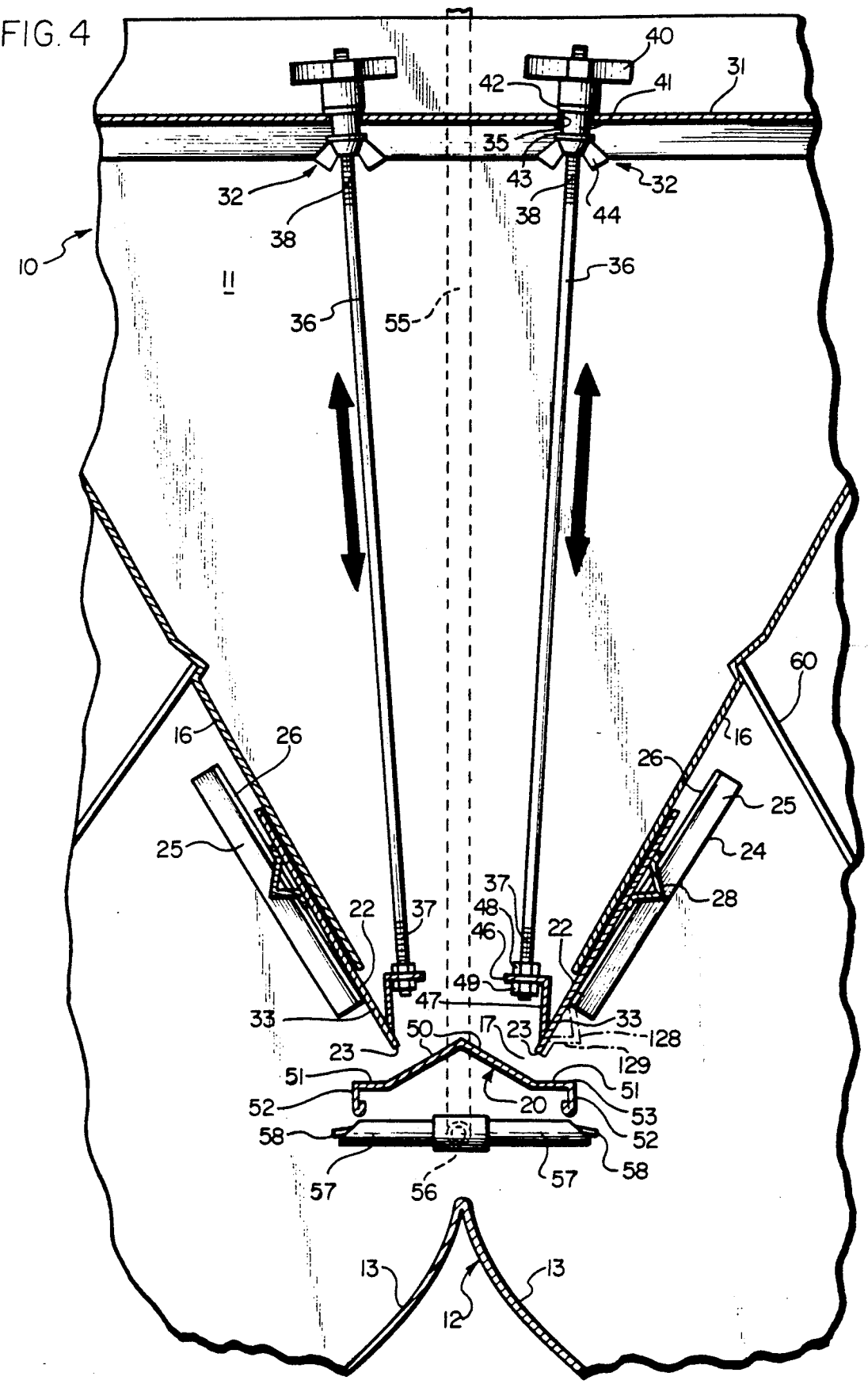
FIG. 4 is a fragmentary, sectional view of a gate adjusting mechanism and associated structure.

Referring initially to FIGS. 1 and 4, indicated generally at 10 is an animal feeder comprising a pair of end walls 11, 11 between which extends a trough indicated generally at 12 and having a pair of concave portions 13, 13 each having a bottom 14. Located above trough bottom portions 14, 14 and between end walls 11, 11 is a hopper indicated generally at 15 and having a pair of mutually converging inclined sidewalls 16, 16 each extending downwardly and inwardly toward a hopper bottom discharge opening 17. Spaced below hopper bottom discharge opening 17 and above the bottom 14 of each trough portion 13 is a shelf indicated generally at 20. Hopper 15 comprises structure for storing animal feed and for dispensing the feed through hopper bottom discharge opening 17. Shelf 20 comprises structure for receiving feed dispensed from hopper 15 through discharge opening 17.

Located at the bottom of each inclined hopper sidewall 16 is a gate 22. Each gate 22 is received between the outer surface of an inclined hopper sidewall 16 and a pair of guide members 24, 24 each mounted on a respective feeder end wall 11 adjacent inclined hopper sidewall 16. Each guide member 24 is inclined at the same angle as hopper inclined sidewall 16 and is spaced outwardly from the sidewall. Each inclined sidewall 16 and its associated pair of inclined guide members 24, 24 constitute structure mounting a gate 22 for sliding movement along sidewall 16 in the direction of inclination of the sidewall, a direction having a substantial vertical component. Each guide member 24 has an L-shaped cross section comprising one flange 25 attached to an endwall 11, as by welding, and another flange 26 for engaging and guiding gate 22.

Gate 22 has a lower edge 23, and the distance between the gate's lower edge 23 and shelf 20 defines the size of the hopper's bottom discharge opening 17.

Mounted on gate 22 is a handle 28 extending between endwalls 11, 11 and engageable by the snout of an animal, such as a hog, for slidably moving gate 22 from a lower position to an upper position to increase the size of hopper bottom discharge opening 17. Gate 22 is normally urged by gravity to a lower position, and feeder 10 is provided with an adjusting mechanism, described below, for varying the lower position of gate 22 to vary the size of hopper bottom discharge opening 17.

Located at the top of feeder 10 and extending between endwalls 11, 11 are a pair of opposed side frame members 30, 30 each being substantially coextensive with an adjacent hopper inclined sidewall 16. Extending between side frame members 30, 30 are a pair of horizontally disposed cross members 31, 31 each located adjacent the top of hopper 15. Each cross member 31 is spaced from the other and is located between the other cross member 31 and an end wall 11. Each cross member 31 mounts a pair of adjusting mechanisms 32, 32, one for each hopper gate 22. Each hopper gate 22 employs a pair of such adjusting mechanisms, and each of the two adjusting mechanisms 32 for a given gate 22 is mounted on a respective cross member 31. Each adjusting mechanism is the same, and the following description of a single adjusting mechanism will be relevant for all four such mechanisms.

Referring now to FIGS. 2-4, each horizontally disposed cross member 31 has an opening 35 through which extends a threaded upper end portion 38 of a substantially vertically disposed rod 36 having a lower end portion 37 connected to gate 22, adjacent the gate's lower edge 23, in a manner to be subsequently described. An internally threaded handle 40 engages the rod's threaded upper end portion 38 above opening 35 in cross member 31. Disposed around the rod's threaded upper end portion 38 is a bushing 41 extending through cross member opening 35. Bushing 41 has an upper flange 42 located above opening 35 and below internally threaded handle 40. Bushing 41 also has a lower flange 43 located below cross member opening 35. Threadedly engaging the rod's threaded upper end portion 38 is a nut 44 located below the bushing's lower flange 43.

Each bushing flange 42, 43 has a cross-sectional area greater than the cross-sectional area of cross member opening 35. Bushing 41 fits loosely around the rod's threaded upper end portion 38 so that the rod's upper end portion 38 can slide readily through bushing 41 without impediment. Similarly, bushing 41 fits loosely within cross member opening 35 so that bushing 41 can slide readily up and down through opening 35 and rock or tilt from true vertical within opening 35 without substantial impediment.

Bushing upper flange 42 normally engages the top surface of cross member 31, and the bottom of internally threaded handle 40 normally bears against the top surface of bushing upper flange 42.

The connection between the rod's lower end portion 37 and gate 22 will now be described. The rod's lower end portion 37 is externally threaded and extends through an opening 45 in a substantially horizontally disposed flange 46 on a bracket having a substantially vertically disposed flange 47 attached to gate 22, as by welding, adjacent the gate's lower edge 23. The rod's threaded lower end portion 37 is secured to bracket flange 46 by a pair of nuts 48, 49 located respectively above and below bracket flange 46 and threadedly engaging the rod's threaded lower end portion 37.

Vertical adjustment of gate 22 is effected by rotating handle 40 which causes rod 36 to advance in an axial direction through handle 40, either upwardly or downwardly depending upon the sense in which handle 40 is rotated. The connection between rod 36 and gate 22, at 45–49, causes gate 22 to move in a direction having an upward vertical component in response to upward movement of rod 36 and in a direction having a downward vertical component in response to downward movement of rod 36.

During the adjustment of gate 22, nut 44 is normally positioned a substantial distance below the bushing's lower flange 43. Adjustment of gate 22 in the manner described above determines the lower position of the gate, and this in turn determines the size of hopper bottom discharge opening 17, absent animal actuated movement of gate 22. When opening 17 has been adjusted to a desired size, nut 44 is tightened against bushing lower flange 43, and this prevents further rotation of handle 40 in turn preventing further adjustment in the size of hopper discharge opening 17 by adjustment mechanism 32. However, the size of opening 17 can be varied in response to animal actuated movement of gate 22, and this will now be described.

When the snout of an animal engages gate handle 28 from below and pushes upwardly against it, gate 22 will be urged upwardly in its slidable mounting between inclined sidewall 16 and guide members 24, 24. This in turn will cause rod 36 to be urged upwardly due to its connection to gate 22 at 45–49 (FIG. 4). As rod 36 is urged upwardly, nut 44 pushes upwardly against bushing lower flange 43 which causes bushing 41 to move upwardly through opening 35 in cross member 31 until the upper surface of bushing lower flange 43 engages the lower surface of cross member 31 around opening 35. When that occurs, upward movement of nut 44 is stopped, and this in turn stops upward movement of rod 36 and gate 22. The gate's upper position is determined by the engagement of bushing lower flange 43 with cross member 31. When the animal disengages its snout from beneath handle 28, gravity urges rod 36 and gate 22 to return from the gate's upper position to the gate's lower position.

In a typical feeder 10, the vertical distance travelled by gate lower edge 23, as gate 22 moves between its lower and upper positions, is about 0.5 in. (12.5 mm).

As noted above, nut 44 is movable on the rod's upper threaded portion 38 between a first or locking position in which the nut is engageable with bushing lower flange 43 and a second position in which nut 44 is spaced from lower flange 43. When nut 44 is in its first position, it prevents operation of the adjustment mechanism to increase the size of opening 38; however the adjustment mechanism comprises structure, including bushing 41 and opening 35 in cross member 31, which cooperate to permit the size of opening 38 to be increased in response to upward urging of gate 22 by the snout of an animal engaging gate handle 28.

As will be described more fully below, feed stored in hopper 15 flows through discharge opening 17 and accumulates on shelf 20 from where it can be swept into the trough by the snout of the animal. The animal cannot feed directly from the shelf, to any significant extent, but must sweep the feed from the shelf into trough portion 13 in order to feed. Increasing the size of the hopper's bottom discharge opening 17 increases the amount of feed which flows through opening 17, and raising and lowering gate 22 also assists in eliminating any blockage of feed flow through bottom discharge opening 17, should such a blockage occur. Opening 17 is typically manually adjusted to a size at which feed will not overflow shelf 20 when gate 22 is at its lower position but will overflow shelf 20 into trough portion 13 when gate 22 is raised to its upper position. The animal soon learns the effects it can produce by raising and lowering gate 22, and it will do so to its advantage.

The size of hopper bottom discharge opening 17 is intended to be such as to allow feed to repose on shelf 20 without falling from the shelf into a trough portion 13, absent animal actuated raising of gate 22. The maximum size to which opening 17 can be adjusted by manipulating adjustment mechanism 32 accommodates to this intent.

Not only can gate 22 be moved upwardly in response to animal actuation, but also the gate can be moved inwardly in response to animal actuation, and the structure which permits the latter type of animal actuated movement will now be described.

Referring to FIGS. 3 and 4, there is a spacing between the outer surface 29 of inclined hopper sidewall 16 and the inner surface 64 of flange 26 on guide member 24. The dimension of this spacing, i.e. the spacing distance, is greater than the thickness of gate 22, and this allows for play on the part of gate 22, between sidewall 16 and guide member flange 26, in a direction transverse to the direction of sliding movement of gate 22.

As shown best in FIG. 3, guide member flange 26 has a lower inner edge 27 normally located above lower edge 23 of gate 22 which has lower and upper end portions 33, 34 respectively (FIGS. 3-4). The gate's lower end portion 33 is normally urged by gravity actuated structure, to be subsequently described, against lower inner edge 27 of guide member flange 26. When an animal engages its snout against the gate's lower end portion 33 and pushes inwardly against it, the gate's lower end portion will move inwardly until the inner surface 39 of gate 22 engages the outer surface 29 of inclined sidewall 16 adjacent the sidewall's lower edge 19. The inward movement of the gate's lower end portion 33 is accommodated by rod 36 and adjusting mechanism 32 in a manner to be subsequently described. When the animal ceases pushing inwardly against gate lower end portion 33 with its snout and disengages its snout from gate lower end portion 33, gravity actuated structure to be subsequently described urges the gate to return to the outer position illustrated in FIG. 3.

The gate's lower edge 23 moves between an outer position and an inner position in response to the animal actuated movement of gate 22, described in the preceding paragraph, and returns from an inner to an outer position in response to the gravity actuated urging described in the preceding paragraph. Gate lower edge 23 is normally in contact with feed which reposes on shelf 20, and the inward and outward movement of gate lower edge 23 tends to agitate the feed which will assist in eliminating any blockage of feed flow through hopper bottom discharge opening 17.

The gravity actuated structure which normally urges the gate's lower edge 23 to its outer position will now be described with particular reference to FIGS. 3 and 4.

Rod 36 is displaced slightly from true vertical (90°), e.g. by a few degrees. More particularly, opening 35 in cross member 31 is not vertically aligned with opening 45 in bracket flange 46 but, instead, opening 42 is located further outwardly (to the right in FIGS. 3 and 4) than is bracket flange opening 45. As noted above, bushing 41 fits loosely within opening 35 and can rock therein. The displacement of rod 36 from true vertical causes a similar displacement on the part of handle 40. Because rod 36 and handle 40 are both so displaced, and because the bottom of handle 40 bears against the top surface of bushing upper flange 42, bushing 41 is urged into a rocked or slightly tilted position in opening 35, as shown in FIG. 3. As a result, there is localized engagement between the bottom surface of bushing upper flange 42 and the top surface of cross member 31, to the right of opening 35 (as viewed in FIG. 3) but not to the left of opening 35. The localized engagement described in the previous sentence provides a pivot location for rod 36 and the rest of adjusting mechanism 32. Because the center of gravity of rod 36 is located below that pivot location, and because rod 36 is urged by gravity to pivot from its displaced disposition toward a true vertical disposition, gravity urges rod 36 and the rest of adjusting mechanism 32 in a counterclockwise sense (to the right as viewed in FIGS. 3 and 4) about the pivotal location described above. This in turn urges the rod's lower end portion 37 in an outward direction. Because the gate's lower end portion 33 and its lower edge 23 are connected to the rod's lower end portion 37 at 45-49, the gate's lower end portion 33 and its lower edge 23 are similarly urged in an outward direction (to the right as viewed in FIGS. 3 and 4).

As noted above, gate 22 can be pushed inwardly (e.g. upon engagement by an animal snout) from an outer gate position to an inner gate position. When this occurs, rod 36 and mechanism 32 are pivoted in a clockwise sense (as viewed in FIGS. 3-4) about the pivot location on cross member 31 described in the preceding paragraph. When the pushing force exerted against gate 22 is released, rod 36 and mechanism 32 are urged by gravity to pivot in a counter-clockwise sense (as viewed in FIGS. 3-4) toward the rod position illustrated in FIGS. 3 and 4, and this returns gate 22 from its inner to its outer position (FIGS. 3-4).

Referring to FIG. 4, shelf 20 has two halves each of which is the mirror image of the other half. Each half includes a downwardly inclined portion 50 integral with an outwardly extending horizontal platform 51 from which depends a vertical flange 52.

Gate 22 is, in effect, an extension of hopper inclined sidewall 16. The angle of inclination of gate 22 and the spacing between platform 51 and the gate's lower end portion 33 are such that an animal is substantially prevented from directly feeding off of platform 51. The relative dimensions of horizontally disposed platform 51 and vertically depending flange 52 also assist in substantially preventing the animal from directly feeding from platform 51. Instead, the animal must sweep the feed accumulating on platform 51 into trough portion 13. The factors which prevent the animal from feeding directly from platform 51 are discussed in more detail in the aforementioned related application and need not be repeated here.

In a typical feeder 10, shelf platform 50 and flange 51 may each be about 1 in. (25.4 mm) wide, for example. In such a feeder, the distance travelled by gate lower edge 23 as gate 22 moves between its inner and outer positions is, for example, about 0.25 in. (6.35 mm).

Illustrated in dash dot lines at 128 in FIG. 4 is a guard extending from gate 22 outwardly relative to inclined hopper sidewall 16 (and its extension, gate 22). Guard 128 is in the form of an outwardly extending projection mounted on gate 22 at a location closer to the gate's lower end portion 33 than to the gate's upper end portion 34. Guard 128 extends outwardly beyond an outer edge 53 of shelf 20, and the guard has a bottom part 129 located above shelf platform 51. Guard bottom part 129 has an inner end connected to gate 22 adjacent the gate's lower edge 23, and the guard's bottom part has an outer end located beyond outer edge 53 of shelf 20. Guard bottom part 129 together with shelf platform 51 defines a space into which an animal can insert its snout to sweep feed from shelf 20. In addition, bottom part 129 of guard 128 and shelf platform 51 comprise structure cooperating to substantially prevent the animal from feeding directly from shelf 20.

Moreover, guard 128 comprises structure for preventing the animal from resting its lower jaw on shelf platform 51 when the animal's snout is pointed substantially parallel to outer edge 53 of shelf 20. It is desirable to prevent the animal from doing so because, when the lower jaw is so disposed, it is possible for the animal to rotate its head in an outward direction until the upper jaw is facing outwardly and the lower jaw is facing inwardly; and when the animal's jaws are in the contorted position described in the preceding phrase of this sentence, it is sometimes possible for the animal to feed directly from the shelf, and this is undesirable. Guard 128 prevents the animal from doing so.

When the animal feeder includes guard 128, the guard can be employed as a substitute for handle 28. In such an embodiment, guard 128 can be engaged from below by the snout of an animal to effect the raising of gate 22 from its lower position to its upper position. In addition, guard 128 can also function as a handle for engagement by the snout of an animal to push the gate's lower edge portion 23 inwardly in the same manner as when the animal's snout engages the gate's lower end portion 33. Guard 128 facilitates animal actuated movement of the gate's lower edge portion in an inward direction.

Feeder 10 also includes a mechanism for dispensing water to the animal, and this is shown in FIGS. 1 and 4. Located below shelf 20 and extending parallel thereto is a feeder pipe 56. Extending outwardly from feeder pipe 56, above each trough 13, are a pair of nozzles 57, 57 each having an actuating member 58 operated by the mouth of an animal. Nozzles 57 and their operation are described in more detail in the aforementioned related application, and that description need not be repeated here. Feeder pipe 56 is connected by a vertically disposed pipe 55 to a source of water (not shown).

Each trough portion 13 comprises an outer wall 59 located outwardly of the shelf's outer edge 53. Trough outer wall 59 has an upper edge 62 located at an elevation below the elevation of shelf 20. Extending angularly upwardly from (a) trough outer wall 59 to (b) hopper inclined sidewall 16 are a pair of braces 60, 60 which divide each side of feeder 10 into three sections 61a-c each for accommodating a respective animal.

In one embodiment of feeder 10, each nozzle 57 is located directly behind a brace 60. This enables each nozzle 57 to service an animal feeding at either of two adjoining sections in the group 61a-c. In addition, locating a nozzle 57 directly behind a brace 60 requires an animal to approach the nozzle from an angle rather than directly head-on, and this discourages the animal from taking excessive amounts of water and from playing with the water nozzle.

The foregoing detailed description has been given for clearness of understanding only, and no unnecessary limitations should be understood therefrom, as modifications will be obvious to those skilled in the art.

I claim:

1. An animal feeder comprising:
a trough having a bottom;
a hopper located above the bottom of said trough;
said hopper having an inclined sidewall extending downwardly and inwardly toward a hopper bottom discharge opening;
said hopper comprising means for storing feed and for dispensing feed though said hopper bottom discharge opening;
a gate located at the bottom of said inclined hopper sidewall;
means mounting said gate for sliding movement along said sidewall in a direction having a substantial vertical component;
handle means on said gate engageable by the snout of an animal for slidably moving said gate from a lower position to an upper position to increase the size of said hopper bottom discharge opening;
adjustment means for slidably moving said gate to vary the size of said hopper bottom discharge opening;
means for locking said adjustment means to prevent further adjustment in the size of said hopper bottom discharge opening by said adjustment means;
means for permitting said gate to be moved slidably upwardly by the snout of an animal engaging said handle means, when said adjustment means is locked;
and means normally urging said gate to its lower position.

2. A feeder as recited in claim 1 wherein said adjustment means comprises:
a horizontally disposed member adjacent the top of said hopper and having an opening;
a substantially vertically disposed rod having a lower end portion connected to said gate and a threaded upper end portion extending through said opening;
an internally threaded handle engaging said threaded upper end portion of the rod above said opening;
and a bushing disposed around said threaded upper end portion of the rod and extending through said opening;
said bushing having an upper flange located above said opening and below said handle and a lower flange located below said opening;
said locking means comprising a nut threadedly engaging the threaded upper end portion of said rod below the bushing's lower flange.

3. A feeder as recited in claim 2 wherein:
each bushing flange has a cross-sectional area greater than the cross-sectional area of said opening.

4. An animal feeder as recited in claim 1 wherein:
said gate has a lower edge located at said hopper bottom discharge opening;
and said mounting means for the gate comprises means permitting animal actuated movement of the gate's lower edge in response to engagement of the gate adjacent its lower edge by the snout of an animal.

5. An animal feeder as recited in claim 4 wherein:
said last recited means comprises means permitting the gate's lower edge to be pushed inwardly by said animal from an outer position to an inner position;
and said feeder comprises gravity actuated means normally urging the lower edge of said gate to its outer position.

6. An animal feeder as recited in claim 5 wherein said urging means comprises:
a horizontally disposed member adjacent the top of said hopper and having an opening;
a substantially vertically disposed rod having a lower end portion connected to said gate and a threaded upper end portion extending through said opening;
an internally threaded handle engaging said threaded upper end portion of the rod above said opening;
said rod being angularly displaced slightly from true vertical (90°);

and means, including the displacement of said rod from true vertical, normally urging the lower end portion of said rod in an outward direction.

7. An animal feeder as recited in claim 6 wherein said means for permitting the gate's lower edge to be pushed inwardly comprises:
guide means inclined at the same angle as the hopper's inclined sidewall and spaced outwardly therefrom;
said guide means and said inclined sidewall comprising means for receiving said gate therebetween;
the spacing distance between said inclined sidewall and said guide means being greater than the thickness of said gate to allow for play on the part of said gate, in a direction transverse to its direction of sliding movement.

8. An animal feeder as recited in claim 7 wherein:
said gate has upper and lower end portions;
said guide means has a lower edge normally located above the lower edge of said gate;
and said lower end portion of the gate is normally urged against said lower edge of the guide means.

9. An animal feeder as recited in claim 5 wherein:
said gate has upper and lower end portions;
and said handle means on said gate is located closer to the gate's lower end portion than to the gate's upper end portion, for engagement by the snout of said animal, to facilitate said animal actuated movement.

10. An animal feeder comprising:
a trough having a bottom;
a hopper located above the bottom of said trough;
said hopper having an inclined sidewall extending downwardly and inwardly toward a hopper bottom discharge opening;
a shelf spaced below said hopper bottom discharge opening and above the bottom of said trough;
said hopper comprising means for storing feed and for dispensing feed through said hopper bottom discharge opening;
said shelf comprising means for receiving and holding feed dispensed from said hopper through said discharge opening;
a gate located at the bottom of said inclined hopper sidewall;
means mounting said gate for sliding movement along said sidewall in a direction having a substantial vertical component;
said shelf having an outer edge;
guard means extending from said gate outwardly relative to said inclined hopper sidewall beyond the outer edge of said shelf;
said guard means having a bottom part located above said shelf and which, with said shelf, defines a space into which an animal can insert its snout to sweep feed from said shelf;
said shelf and said guard means comprising means cooperating to substantially prevent the animal from feeding directly from the shelf;
and said guard means comprises means for preventing the animal from resting its lower jaw on the shelf when the animal's snout is pointed substantially parallel to the shelf's outer edge.

11. An animal feeder as recited in claim 7 wherein:
said gate has a lower edge located at the hopper bottom discharge opening;
and the bottom part of said guard means has an inner end connected to said gate adjacent the gate's lower edge and an outer end located beyond the outer edge of said shelf.

12. In an animal feeder having a hopper and a hopper gate mounted for sliding movement in a direction having a substantial vertical component, an adjusting mechanism for said gate, said adjusting mechanism comprising:
a horizontally disposed member located above said hopper gate and having an opening;
a substantially vertically disposed rod having a lower end portion connected to said gate and a threaded upper end portion extending through said opening;
an internally threaded handle engaging said threaded upper end portion of the rod above said opening;
a bushing disposed around said threaded upper end portion of the rod and extending through said opening;
said bushing having an upper flange located above said opening and below said handle and a lower flange located below said opening;
and a nut threadedly engaging the threaded upper end portion of said rod below the bushing's lower flange for movement of said nut between a first position in which the nut engages said lower bushing flange and a second position in which said nut is spaced from the lower bushing flange;
and means, including said horizontally disposed member and said bushing, cooperating to permit said rod to move slidably through said opening when said nut is in its first position.

13. An adjusting mechanism as recited in claim 12 wherein:
each bushing flange has a cross-sectional area greater than the cross-sectional area of said opening.

14. In an animal feeder having a hopper and a hopper gate mounted for sliding movement in a direction having a substantial vertical component, an adjusting mechanism for said gate, said adjusting mechanism comprising:
a horizontally disposed member located above said hopper gate and having an opening;
a substantially vertically disposed rod having a lower end portion connected to said gate and a threaded upper end portion extending through said opening;
an internally threaded handle engaging said threaded upper end portion of the rod above said opening;
a bushing disposed around said threaded upper end portion of the rod and extending through said opening;
said bushing having an upper flange located above said opening and below said handle and a lower flange located below said opening;
a nut threadedly engaging the threaded upper end portion of said rod below the bushing's lower flange;
the lower end portion of said rod being spaced laterally from said gate;
said rod being angularly displaced from true vertical (90°);
and means including the displacement of said rod from true vertical, for urging said rod toward said gate.

15. An animal feeder comprising:
a hopper having an inclined sidewall extending downwardly and inwardly toward a hopper bottom discharge opening;

said hopper comprising means for storing feed and for dispensing feed through said hopper bottom discharge opening;

a gate located at the bottom of said inclined hopper sidewall;

means mounting said gate for sliding movement along said sidewall in a direction having a substantial vertical component;

an adjusting mechanism comprising means for slidably moving said gate to vary the size of said bottom discharge opening;

means for locking said adjusting mechanism, to prevent further adjustment in the size of said opening by said adjusting mechanism;

means for permitting an animal to slidably raise said gate from a lower to an upper position, to increase the size of said opening when said adjusting mechanism is locked;

and means normally urging said gate to return to said lower position.

16. A feeder as recited in claim 15 wherein:

said feeder comprises a shelf spaced below said hopper bottom discharge opening;

said shelf comprising means for receiving feed dispensed from said hopper through said discharge opening;

said gate having a pair of horizontally spaced end walls;

said means for permitting an animal to slidably raise said gate comprising handle means extending longitudinally between said end walls on said gate above the bottom edge of said gate and engageable from below by the snout of an animal.

17. A feeder as recited in claim 16 wherein:

said shelf has an outer edge;

said handle means comprises guard means extending from said gate outwardly relative to said inclined hopper sidewall beyond the outer edge of said shelf;

said guard means having a bottom part located above said shelf and which, with said shelf, defines a space into which an animal can insert its snout to sweep feed from said shelf;

said shelf and said guard means comprising means cooperating to substantially prevent the animal from feeding directly from the shelf;

and said guard means comprises means for preventing the animal from resting its lower jaw on the shelf when the animal's snout is pointed substantially parallel to the shelf's outer edge.

18. An animal feeder as recited in claim 17 wherein:

said gate has a lower edge located at the hopper bottom discharge opening;

and the bottom part of said guard means has an inner end connected to said gate adjacent the gate's lower edge and an outer end located beyond the outer edge of said shelf.

19. A feeder as recited in claim 16 wherein:

said adjustment mechanism comprises means for varying the lower position of said gate to vary the size of said hopper bottom discharge opening;

said adjustment mechanism and said shelf comprising means cooperating to hold feed on said shelf when the gate is in its lower position and to permit overflow of feed from said shelf into said trough when the gate is in its upper position.

* * * * *